United States Patent
Fransen et al.

(10) Patent No.: US 9,444,851 B2
(45) Date of Patent: Sep. 13, 2016

(54) INTERCEPTING DEVICE-TO-DEVICE COMMUNICATION

(71) Applicants: Koninklijke KPN N.V., The Hague (NL); Nederlandse Organisatie Voor Toegepast-Natuurwetenschappelijk Onderzoek TNO, 's-Gravenhage (NL)

(72) Inventors: Frank Fransen, Zuidhorn (NL); Antonius Norp, The Hague (NL); Ljupco Jorguseski, Rijswijk (NL)

(73) Assignees: Koninklijke KPN N.V., The Hague (NL); Nederlandse Organisatie Voor Toegepast-Natuurwetenschappelijk Onderzoek TNO, 's-Gravenhage (NL)

(*) Notice: Subject to any disclaimer, the term of this patent is extended or adjusted under 35 U.S.C. 154(b) by 0 days.

(21) Appl. No.: 14/438,786

(22) PCT Filed: Oct. 25, 2013

(86) PCT No.: PCT/EP2013/072414
§ 371 (c)(1),
(2) Date: Apr. 27, 2015

(87) PCT Pub. No.: WO2014/067875
PCT Pub. Date: May 8, 2014

(65) Prior Publication Data
US 2015/0288724 A1 Oct. 8, 2015

(30) Foreign Application Priority Data
Oct. 29, 2012 (EP) .................................. 12190362

(51) Int. Cl.
*H04L 29/06* (2006.01)
*H04W 76/02* (2009.01)
(Continued)

(52) U.S. Cl.
CPC .............. *H04L 63/30* (2013.01); *H04W 12/02* (2013.01); *H04W 76/023* (2013.01); *H04W 88/08* (2013.01)

(58) Field of Classification Search
CPC .. H04L 63/30; H04W 76/023; H04W 88/08; H04W 28/12; H04W 4/18
USPC .................................................. 455/517–519
See application file for complete search history.

(56) References Cited

U.S. PATENT DOCUMENTS 8,902,855 B2 * 12/2014 Etemad ................. H04W 36/14
370/331
2006/0258383 A1* 11/2006 Jiang et al. ................... 455/502
(Continued)

FOREIGN PATENT DOCUMENTS

JP 2002 290397 10/2002
JP 2005 244534 8/2005
(Continued)

OTHER PUBLICATIONS

3GPP TSG-SA WG1 Meeting #57, Proximity Aware Service Consideration on Lawful Interception, Kyoto Japan, Feb. 17, 2012.*
Notification of Transmittal of the International Search Report and the Written Opinion of the International Searching Authority, PCT/EP2013/072414, Date of Mailing Jan. 20, 2014.
(Continued)

*Primary Examiner* — Brandon Miller
(74) *Attorney, Agent, or Firm* — Hamilton, Brook, Smith & Reynolds, P.C.

(57) ABSTRACT

Mobile network (MN) for mobile devices (UE1, UE2), the mobile devices being arranged for exchanging communication data via the mobile network or, by selection, via a Device-To-Device [D2D] communication channel, the mobile network comprising a base station (ENB1) and a controller (010), wherein the controller (010) is arranged for: i) receiving an interception request from a lawful intercept controller (020), the interception request being indicative of a subscriber; ii) determining whether a target device associated with the subscriber participates in the D2D communication channel (D2D) based on D2D control data; and iii) if the target device is deemed to participate in the D2D communication channel (D2D), requesting the base station (ENB1) to intercept the communication data exchanged via the D2D communication channel (D2D); and wherein the base station (ENB1) is arranged for, in response to a request from the controller, intercepting radio signals (RS) of the D2D communication channel based on the D2D control data.

15 Claims, 5 Drawing Sheets

(51) Int. Cl.
*H04W 12/02* (2009.01)
*H04W 88/08* (2009.01)

(56) References Cited

U.S. PATENT DOCUMENTS

| | | |
|---|---|---|
| 2007/0253376 A1 | 11/2007 | Bonta et al. |
| 2009/0320102 A1 | 12/2009 | Ou |
| 2011/0194460 A1* | 8/2011 | Witzel et al. ................. 370/259 |
| 2011/0252144 A1 | 10/2011 | Tung et al. |
| 2013/0013926 A1 | 1/2013 | Hakola et al. |
| 2013/0054967 A1 | 2/2013 | Davoust et al. |
| 2013/0094638 A1* | 4/2013 | Anchan ....................... 379/88.19 |
| 2013/0227655 A1 | 8/2013 | Vanderveen et al. |
| 2014/0067987 A1* | 3/2014 | Agrawal et al. ............. 709/213 |
| 2015/0222612 A1 | 8/2015 | Norp et al. |

FOREIGN PATENT DOCUMENTS

| | | |
|---|---|---|
| JP | 2006 238273 | 8/2006 |
| JP | 2006 253837 | 9/2006 |
| JP | 2008 539643 | 11/2008 |
| JP | 2009 512296 | 3/2009 |
| JP | 2011 147148 | 7/2011 |
| JP | 2012 502587 | 1/2012 |
| WO | WO 2010/030515 A2 | 3/2010 |
| WO | WO 2010/150813 | 12/2010 |
| WO | WO 2011/117677 A1 | 9/2011 |

OTHER PUBLICATIONS

European Search Report with regards to European Patent Application No. 12190362.9, Date of Completion Apr. 3, 2013.

"Proximity aware service consideration on lawful interception," *Institute for Information Industry (III)*, TSG-SA WG1 Meeting #57, Kyoto, Japan (Feb. 2012).

"Anonymously multi-party communication interception," *Institute for Information Industry (III)*, TSG-SA WG1 Meeting #57, Kyoto, Japan (Feb. 2012).

"Lawful Interception for 3G and 4G Networks," Jan. 31, 2012, Retrieved from the Internet: URL;http://www.aqsacom.com/resources/pdf/Li-3G-4G-White.pdf.

$3^{rd}$ Generation Partnership Project: Technical Specification Group Radio Access Network; Evolved Universal Terrestrial Radio Access (E-UTRA) and Evolved Universal Terrestrial Radio Access Network (E-UTRAN); Overall description; Stage 2 (Release 11), 3GPP TS 36.300, V11.3.0 (Sep. 2012).

$3^{rd}$ Generation Partnership Project; Technical Specification Group Services and Systems Aspects; 3G security; Lawful interception architecture and functions (Release 11), 3GPP TS 33.107 V11.3.0 (Sep. 2012).

$3^{rd}$ Generation Partnership Project; Technical Specification Group Services and System Aspects; Service requirements for the Evolved Packet Systems (EPS) (Release 11), 3GPP TS 22.278 V11.6.0 (Sep. 2012).

Fodor, G., et al., "Design Aspects of Network Assisted Device-to-Device Communications," IEEE Communications Magazine, pp. 170-177, Mar. 2012.

Zhang, et al., "Security Analysis and Enhancements of 3GPP Authentication and Key Agreement Protocol"; Wireless Communications, IEEE Transactions, 9 pages (2005).

* cited by examiner

INTERCEPTING DEVICE-TO-DEVICE COMMUNICATION

This application is the U.S. National Stage of International Application No. PCT/EP2013/072414, filed Oct. 25, 2013, which designates the U.S., published in English, and claims priority under 35 U.S.C. §§119 or 365(c) to European Application No. 12190362.9, filed Oct. 29, 2012.

FIELD OF THE INVENTION

The invention relates to a mobile network for mobile devices, wherein the mobile devices are arranged for exchanging communication data via the mobile network or, by selection, via a device-to-device communication channel.

The invention further relates to a method for use in the mobile network, and to control software for execution on equipment of the mobile network.

Mobile communication networks, also referred to as cellular networks or in short mobile networks, have been extensively deployed over the last decades in order to address the increasing need for mobile communication. Communication between mobile devices which are connected to such a mobile network typically takes place via the mobile network, i.e., via one or more base stations and core nodes of the mobile network.

Certain types of mobile devices, which are normally connected to a mobile network, may also be arranged for directly communicate with each other via device-to-device (D2D) communication. In general, D2D communication is characterized by a direct wireless communication path existing between two mobile terminals, such as the mobile devices, while maintaining, at least at some moments in time, at least a signaling connection with/via a base station of the wireless communication network, i.e., the mobile network. The direct wireless communication path between mobile terminals allows offloading the base station(s), the access network and the core network of the wireless communication network from most of the data and signaling exchanged between the mobile terminals. The signaling connection with (a base station of) the wireless communication network allows the wireless communication network to control the resources assigned to the direct communication path between the terminals. It is noted that the signaling connection is typically constituted by, i.e., corresponds to, a control channel over which control data is exchanged.

An example of a mobile communication standard which enables mobile communication between mobile devices both via the mobile network as well as via the aforementioned D2D communication is Terrestrial Trunked Radio (TETRA).

An example of a mobile communication standard which is deemed to enable mobile communication between mobile devices both via the mobile network as well as via the aforementioned D2D communication is Long Term Evolution (LTE). Within the 3rd Generation Partnership Project (3GPP), standardization activities have started in order to incorporate D2D communication in the LTE mobile communication standard. It is noted that in 3GPP, such D2D communication is also referred to as a Proximity-based Service (ProSe).

BACKGROUND OF THE INVENTION

National legislation may require so-termed Lawful Interception (LI) to be possible in public communication networks such as mobile networks. Here, the term lawful interception generally refers to intercepting communication on a public communication network on request from a law enforcement agency for the purpose of screening the communication. Several approaches are known for intercepting communication data exchanged via mobile networks, e.g., as described in Aqsacom Document No. 100458, "LAWFUL INTERCEPTION FOR 3G AND 4G NETWORKS", White paper, March 2010.

It may be desirable and/or required to also enable lawful interception of the communication data exchanged via D2D communication channels. For example, in the 3GPP TS 22.278 service requirements for the Evolved Packet System (EPS) it is stated that the EPS shall provide appropriate mechanisms to enable lawful intercept. EPS constitutes a core network architecture of LTE. A problem with enabling lawful interception of communication data exchanged via D2D communication channels is that such D2D communication takes place directly between the mobile devices, i.e., without transferring the communication data over a network element of the mobile network. It is therefore difficult for a Mobile Network Operator (MNO) to enable lawful interception of such communication data.

As a possible solution, a MNO may prevent the establishment of D2D communication between the mobile devices when a subscriber associated with one of these mobile devices is the subject of lawful interception. In such a case, when the MNO receives a request to establish a D2D communication channel from a user, and one of the participants in the D2D communication channel is the subject of lawful interception, the MNO may instead route the communication via a network element of mobile network that is equipped with lawful interception capabilities, e.g., a base station such as an eNodeB.

SUMMARY OF THE INVENTION

A problem of providing lawful interception by preventing the establishment of D2D communication channels which involve a subject of lawful interception is that such lawful interception may be easily detectable by the subject, e.g., by analyzing the communication of the subject's mobile device.

It would be advantageous to provide less easily detectable interception of communication data exchanged via a D2D communication channel.

To better address this concern, the following aspects of the present invention provide a mobile network for mobile devices, a base station and controller configured for use in the mobile network, a method for use in the mobile network, and control software for execution on equipment of the mobile network, which enable interception of the communication data being exchanged via the D2D communication channel, i.e., without a need to route the communication data through the mobile network.

A first aspect of the present invention provides a mobile network for mobile devices, the mobile devices being arranged for exchanging communication data via the mobile network or, by selection, via a Device-To-Device [D2D] communication channel, the mobile network comprising:
 a base station for establishing a control channel between one of the mobile devices and the mobile network; and
 a controller for, via the control channel, i) receiving a request from the mobile device for establishing the D2D communication channel with a further mobile device, and ii) controlling the establishing of the D2D communication channel by exchanging D2D control data with the mobile device;

wherein the controller is arranged for:

i) receiving an interception request from a lawful intercept controller, the interception request being indicative of a subscriber;

ii) determining whether a target device associated with the subscriber participates in the D2D communication channel based on the D2D control data; and iii) if the target device is deemed to participate in the D2D communication channel, requesting the base station to intercept the communication data exchanged via the D2D communication channel;

and wherein the base station is arranged for, in response to a request from the controller, intercepting radio signals of the D2D communication channel based on the D2D control data.

A further aspect of the present invention provides a base station and controller configured for use in the mobile network as set forth above.

A further aspect of the present invention provides a method for use in a mobile network for mobile devices, the mobile devices being arranged for exchanging communication data via the mobile network or, by selection, via a Device-To-Device [D2D] communication channel, the mobile network comprising:

a base station for establishing a control channel between one of the mobile devices and the mobile network; and a controller for, via the control channel, i) receiving a request from the mobile device for establishing the D2D communication channel with a further mobile device, and ii) controlling the establishing of the D2D communication channel by exchanging D2D control data with the mobile device;

the method comprising:

i) receiving an interception request from a lawful intercept controller, the interception request being indicative of a subscriber;

ii) determining whether a target device associated with the subscriber participates in the D2D communication channel based on the D2D control data; and iii) if the target device is deemed to participate in the D2D communication channel, using the base station to intercept the D2D communication channel by intercepting radio signals of the D2D communication channel based on the D2D control data.

A further aspect of the present invention provides control software for execution on equipment of a mobile network for mobile devices, the mobile devices being arranged for exchanging communication data via the mobile network or, by selection, via a Device-To-Device [D2D] communication channel, the mobile network comprising:

a base station for establishing a control channel between one of the mobile devices and the mobile network; and a controller for, via the control channel, i) receiving a request from the mobile device for establishing the D2D communication channel with a further mobile device, and ii) controlling the establishing of the D2D communication channel by exchanging D2D control data with the mobile device;

the control software comprising instructions operative to:

i) receive an interception request from a lawful intercept controller, the interception request being indicative of a subscriber;

ii) determine whether a target device associated with the subscriber participates in the D2D communication channel based on the D2D control data; and iii) if the target device is deemed to participate in the D2D communication channel, using the base station to intercept the D2D communication channel by intercepting radio signals of the D2D communication channel based on the D2D control data.

The aforementioned mobile devices are connectable to the mobile network in that, when the mobile devices are connected to the mobile network, communication data between the mobile devices is exchanged via the mobile network, e.g., via the base stations and core nodes of the mobile network. The mobile devices are also arranged for establishing a D2D communication channel between the mobile devices so as to enable exchange of communication data via said D2D communication channel. The D2D communication channel may be established between two mobile devices. However, the D2D communication channel may equally involve a plurality of more than two mobile devices.

The mobile network comprises at least one base station which establishes a control channel between at least one of the mobile devices and the mobile network. The control channel enables control data to be exchanged between the mobile device and the mobile network, thereby establishing a signaling connection. The mobile network comprises a controller that controls the establishing of the D2D communication channel between the mobile devices. A reason for said controlling is that the operator may desire to only grant specific users access to the D2D communication, e.g., subscribers to a D2D service, emergency workers, etc. Another reason for said controlling from, in general, the mobile network is that, e.g., the D2D communication channel may occupy a frequency spectrum which is licensed to the operator, and which thus needs to be managed by the operator. For effecting the control of the D2D communication channel, the controller exchanges D2D control data with the mobile device via the control channel and thus through the base station.

The controller is further arranged for receiving an interception request from a lawful intercept controller, which may or may not be part of the mobile network. The interception request is indicative of a subscriber of the mobile network. The interception requests may be indicative of the subscriber in various known ways, e.g., by specifying a subscriber identifier such as a International Mobile Subscriber Identity (IMSI), a phone number such as a Mobile Subscriber Integrated Services Digital Network (MSISDN) number and a mobile device identifier such as a International Mobile Equipment Identity (IMEI) number. The controller determines whether a target device associated with the subscriber participates in the D2D communication channel. Effectively, the controller determines whether the subscriber is associated with one of the mobile devices used in the D2D communication. For that purpose, the controller makes use of the D2D control data. It is noted that it is known per se in the field of mobile communication how to determine whether a mobile device is associated with a subscriber. For example, in 3GPP, a Home Subscriber Server (HSS) may be used to lookup an IMSI associated with an IMEI, and vice versa.

If the target device is deemed to take part in the D2D communication channel, the controller requests the base station to intercept the communication data exchanged via the D2D communication channel. Thus, if the target device is deemed to take part in the D2D communication channel, either the mobile device or the further mobile device may be the target device. In order to intercept the communication data, the base station is arranged for using the D2D control data to intercept the radio signals of the D2D communication channel in which the subscriber is participating. As such, radio signals are obtained, which enable, e.g., a decoder to obtain the communication data by decoding the radio signals.

The aforementioned measures have the effect that communication data exchanged via D2D communication channel involving a subscriber that is subject of lawful interception can be intercepted by a base station of the mobile network. It is therefore not needed to redirect the communication data through the mobile network and thereby effectively disabling the D2D communication. By using the D2D control data which is used to establish the D2D communication channel, it can determined whether the subscriber participates in the D2D communication channel. A reason for this is that the D2D control data is indicative of the subscribers involved in the D2D communication, as it is being used to control the establishing of the D2D communication channel. For the same reason, the radio signals of the D2D communication channel can be specifically intercepted since the D2D control data allows the subscriber and thus the target device to be identified.

Advantageously, it is more difficult for a subject of lawful interception to detect that he/she is indeed being subjected to the lawful interception, since an analysis of the communication of the mobile device still shows the communication data being exchanged via the D2D communication channel. Advantageously, the interception is performed by the mobile network itself, without a need for a separate (mobile) interception unit.

Optionally, the base station is arranged for configuring a radio of the mobile device via the control channel for increasing a transmission range of the radio signals of the mobile device. The radio of the mobile device is used in the D2D communication channel. By configuring the radio so as to increase a transmission range of the radio signals of the mobile device, a more reliable interception is obtained. Advantageously, it is avoided that the radio of the mobile device is specifically configured for the D2D communication, which could result in the base station having a poor reception quality. Rather, the radio is configured to also take into account a sufficient reception quality by the base station.

Optionally, the base station is arranged for configuring the radio of the mobile device by providing one or more radio resource parameters to the mobile device, the one or more radio resource parameters defining one or more of the group of: a signal strength and a frequency. Said radio resource parameters are well suited for improving the reception quality by the base station. For example, the signal strength may be increased and/or a frequency may be chosen in which the radio signals are least subject to attenuation.

Optionally, the base station is arranged for, when configuring the radio of the mobile device for increasing the transmission range, also configuring the radios of other mobile devices involved in D2D communication for said increasing the transmission range. Optionally, the base station is arranged for, when configuring the radio of the mobile device for increasing the transmission range, also configuring the radios of other mobile devices involved in D2D communication which does not involve the target device, for said increasing the transmission range. Although detecting a configuration of the radio for the purpose of lawful interception is generally difficult, it may be possible for a subject to compare a configuration of the radio of his/her mobile device with the configuration of another mobile device, e.g., by measuring and comparing a signal strength and/or frequency. Differences in the comparison may cause the subject to suspect or conclude that he/she is subject of lawful interception. By also re-configuring the radios of other mobile devices involved in D2D communication, or those involved in D2D communication which does not involve the target device, said detection is avoided or made more difficult.

Optionally, the base station is arranged for selecting the other mobile devices based on an estimate of a geographical distance to the mobile device and/or the further mobile device of the D2D communication channel. Advantageously, not all the mobile devices which take part in D2D communication channels are configured accordingly, but rather only those that are nearby the subject. Advantageously, a compromise is obtained between detectability of the lawful interception and a configuration of radios which may be disadvantageous for other users, e.g., due to an increase in signal strength resulting in an increase in power consumption.

Optionally, the base station is arranged for configuring the radios of substantially all mobile devices involved in D2D communication. The base station thus configures the radios of substantially all mobile devices under its control accordingly. Thus, the detectability of the lawful interception is reduced as much as possible.

Optionally, the mobile network further comprises:
a further base station for intercepting the radio signals of the D2D communication channel based on the D2D control data; and
a combiner for reconstructing the radio signals of the D2D communication channel by combining the radio signals received by base station and the radio signals received by the further base station.

The interception of the D2D communication channel is thus based on the interception of the radio signals of the D2D communication channel by more than one base station. For that purpose, the radio signals intercepted from the base stations are combined by a combiner, thereby obtaining a combination from which the communication data can be decoded. Advantageously, a better overall reception quality can be obtained.

Optionally, the further base station is arranged for intercepting the radio signals if a reception quality of the radio signals by the base station is deemed to be insufficient. Hence, the further base station is selectively employed in the interception.

Optionally, the further base station is selected amongst a plurality of base stations based on an estimate of the reception quality of the radio signals by the further base station. Advantageously, the further base station is selected amongst a plurality of base station so as to provide an optimal reception quality of the radio signals.

Optionally, the estimate of the reception quality of the radio signals by the further base station is based on an estimate of a geographical distance to the mobile device and/or the further mobile device of the D2D communication channel.

Optionally, the base station is arranged for requesting the further base station to intercept the radio signals of the D2D communication channel via the mobile network. Advantageously, the lawful interception can be handed over from one base station to another, e.g., in case the subject physically moves from the range of one base station to another.

Optionally, the mobile network further comprises a signal interface provided between the base station and the further base station, and wherein the signal interface is arranged for enabling the base station to request the further base station to intercept the radio signals of the D2D communication channel. Advantageously, the signal interface is provided by extending the X2 radio access network signal interface between eNodeBs as defined by 3GPP to enable handover of the lawful interception between eNodeBs.

Modifications and variations of the method and the control software, which correspond to the described modifications and variations of the mobile network, can be carried out by a person skilled in the art based on the present description.

The invention is defined in the independent claims. Advantageous yet optional embodiments are defined in the dependent claims.

BRIEF DESCRIPTION OF THE DRAWINGS

These and other aspects of the invention are apparent from and will be elucidated with reference to the embodiments described hereinafter. In the drawings.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EMBODIMENTS

Figure 1:
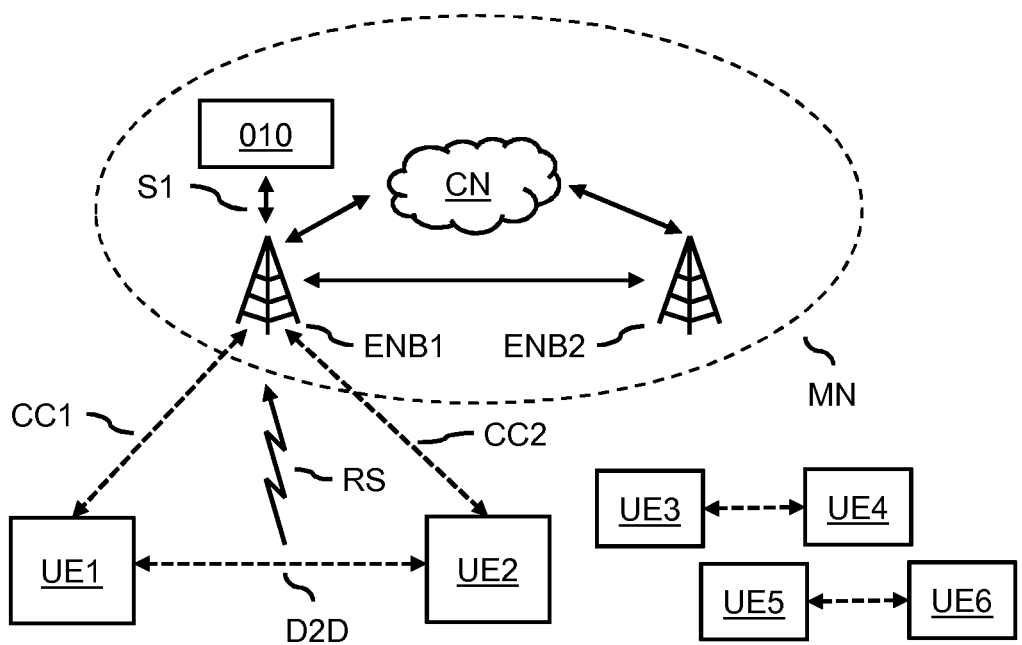
FIG. 1 shows a mobile network for mobile devices, comprising a controller for requesting a base station of the mobile network to intercept communication data exchanged via a D2D communication channel between the mobile devices.

FIG. 1 shows a mobile network MN for mobile devices UE1, UE2. The mobile devices UE1, UE2, also commonly referred to as user equipment (UE), are arranged for exchanging communication data via the mobile network MN. This may be a normal operation of the mobile devices UE1, UE2, i.e., such communication data may be normally exchanged via the mobile network. The mobile devices UE1, UE2 are further arranged for, by selection, exchanging the communication data via a Device-To-Device [D2D] communication channel. The D2D communication channel is indicated in FIG. 1 as a dashed line. It is noted that, although not explicitly shown in FIG. 1, the D2D communication channel is constituted by radio signals which are exchanged between the mobile devices UE1, UE2.

The mobile network MN comprises a base station ENB1. The base station ENB1 is arranged for establishing a control channel CC1 between one of the mobile devices UE1 and the mobile network. The control channel CC1 is indicated in FIG. 1 as a further dashed line. The control channel CC1 enables an exchange of control data between the mobile device UE1 and the mobile network MN. The mobile network MN further comprises a controller 010. The controller 010 is arranged for, via the control channel CC1, receiving a request from the mobile device for establishing the D2D communication channel D2D with a further mobile device UE2. The controller 010 is further arranged for controlling the establishing of the D2D communication channel by exchanging D2D control data with the mobile device. FIG. 1 shows the controller 010 being connected to the base station ENB1 via an internal network interface Si. Consequently, the D2D control data can be exchanged between the controller 010 and the mobile device UE1 by making use of the internal network interface Si between the controller 010 and the base station ENB1 and the control channel CC1 between the base station ENB1 and the mobile device UE1.

The controller 010 controls the establishing of the D2D communication channel. For example, the controller 010 may allow or deny the request to establish the D2D communication channel. The controller 010 is operatively arranged for performing the following operations. The controller 010 receives an interception request from a lawful intercept controller (not shown in FIG. 1). The interception request is indicative of a subscriber. The controller 010 determines whether a target device associated with the subscriber participates in the D2D communication channel based on the D2D control data. If the target device is deemed to participate in the D2D communication channel, the controller 010 requests the base station ENB1 to intercept the communication data exchanged via the D2D communication channel. Moreover, the base station ENB1 is arranged for, in response to a request from the controller, intercepting radio signals RS of the D2D communication channel based on the D2D control data.

It is noted that the subscriber being the subject of the lawful interception request may be participating in the D2D communication channel by means of either the mobile device UE1 or the further mobile device UE2, the former being further also referred to as the first mobile device UE1 and the latter also as the second mobile device UE2. Thus, the target device may be either the first mobile UE1 or the second mobile UE2. The radio signals RS of the D2D communication channel intercepted by the base station ENB1 may be radio signals RS from either or both mobile devices. It will be appreciated that even if the subscriber is participating in the D2D communication channel by means of the second mobile device UE2 and the base station ENB1 is intercepting the radio signals RS transmitted by the first mobile device UE1, the communication data which may be decoded from the radio signals RS may still be, and typically is, valuable in the lawful interception even if said communication data does not originate directly from the first mobile device UE1.

FIG. 1 further shows a further base station ENB2 and other mobile devices UE3-UE6 involved in D2D communication which will be discussed in reference to FIG. 3.

Figure 2:
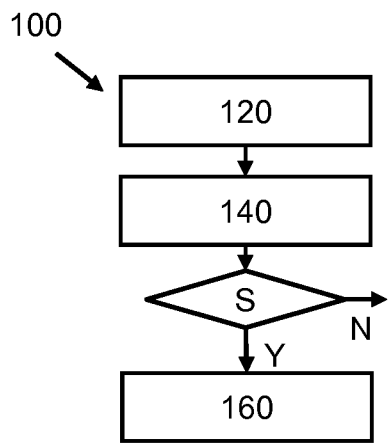
FIG. 2 shows a method for use in the mobile network to intercept the communication data exchanged via the D2D communication channel.

FIG. 2 shows a method 100 use in the mobile network MN as shown in FIG. 1. The method 100 comprises, in a first step titled "RECEIVING INTERCEPTION REQUEST", receiving 120 an interception request from a lawful intercept controller, the interception request being indicative of a subscriber. The method 100 further comprises, in a second step titled "DETERMINING PARTICIPATION OF TARGET DEVICE", determining 140 whether a target device associated with the subscriber participates in the D2D communication channel based on the D2D control data. The method 100 further comprises, in a third step titled "INTERCEPTING D2D COMMUNICATION", if the target device is deemed to participate in the D2D communication channel, using 160 the base station to intercept the D2D communication channel by intercepting radio signals of the D2D communication channel based on the D2D control data. It is noted that the execution of the third step is conditional on whether the subscriber is deemed to participate in the D2D communication channel, which is illustrated in FIG. 2 by including a conditional step S.

Control software may be provided for execution on equipment of the mobile network MN. The control software may comprise instructions operative to perform the steps of the method 100, namely receive 120 an interception request from a lawful intercept controller, the interception request being indicative of a subscriber, determine 140 whether the subscriber participates in the D2D communication channel based on the D2D control data, and if the subscriber is deemed to participate in the D2D communication channel, using 160 the base station to intercept the D2D communication channel by intercepting radio signals of the D2D communication channel based on the D2D control data.

Figure 3:
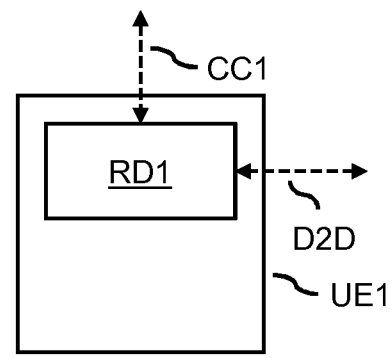
FIG. 3 shows a radio of the mobile device.

FIG. 3 shows the mobile device UE1 in more detail. In particular, FIG. 3 shows the mobile device UE1 comprising a radio RD1. The radio RD1 is for use in the D2D communication channel, i.e., for transmitting and receiving radio signals RS to and from the other mobile device UE2, with the radio signals RS together constituting the D2D communication channel. It is noted that the term radio refers to a radio frequency circuit. The radio may be connected to one or more radio antenna's comprised in the mobile device UE1 (not shown in FIG. 3). It is noted that the radio RD1 may also be used for the control channel CC1 as well as for other communication with the mobile network MN. However, this is not a limitation, as the mobile device UE1 may instead comprise a separate radio for communicating with the mobile network MN. The radio RD1 may be remotely configurable by the mobile network MN. In particular, the base station ENB1 may be arranged for configuring the radio RD1 of the mobile device UE1 via the control channel CC1 for enabling controlling radio resource(s) used by the radio RD1. An example of a radio resource is a frequency at which communication takes place. Another example is a signal strength.

The base station ENB1 may be arranged for configuring the radio RD1 of the mobile device UE1 specifically for the purpose of controlling the radio resource(s) used in the D2D communication. In particular, the base station ENB1 may be arranged for increasing a transmission range of the radio signals RS which are used in the D2D communication channel. Hence, the radio resource(s) are set or adjusted so as to increase the transmission range of the radio signals RS of the mobile device UE1. Typically, this results in the radio signals RS being receivable at a larger distance to the mobile device UE1, and/or a quality of the reception of the radio signals RS improving, e.g., at a distance to the mobile device UE1 at which the radio signals RS were previously poorly receivable. In particular, the base station ENB1 may be arranged for configuring the radio RD1 of the mobile device UE1 by providing one or more radio resource parameters to the mobile device, the one or more radio resource parameters defining one or more of the group of: a signal strength and a frequency. Consequently, the signal strength of the radio signals RS of the mobile device UE1 may be increased and/or a frequency of the radio signals RS may be chosen such that the transmission range is increased. For example, a lower frequency may be chosen. Similarly, a signal strength may be chosen which is higher than needed for D2D communication. Consequently, the radio signals RS are better receivable by the base station ENB1.

It is noted that the base station ENB1 may configure the radio RD1 in response to the request of the controller 010 to intercept the communication data. Additionally or alternatively, the base station ENB1 may be arranged for autonomously configuring the radio RD1, e.g., if the reception of the radio signals RS is insufficient.

Referring back to FIG. 1, it is noted that the base station ENB1 may also configure the radio of the second mobile device UE2 to increase the transmission range of the radio signals RS of the second mobile device UE2 if the second mobile device UE2 is connected to the base station ENB1. It is noted that, although not shown in FIG. 1, the second mobile device UE2 may instead be connected to the further base station ENB2. Consequently, the control channel CC2 between the second mobile device UE2 and the mobile network MN may be established via the further base station ENB2. In this case, the further base station ENB2 may be arranged for configuring the radio of the second mobile device UE2 to increase the transmission range of the radio signals RS of the second mobile device UE2. Hence, the radio signals RS of the second mobile device UE2 are better receivable by the further base station ENB2. For that purpose, the further base station ENB2 may be arranged similarly or a same as the base station ENB1, i.e., it may also be arranged for, in response to a request from the controller 010, intercepting the radio signals RS based on the D2D control data. Moreover, the further base station ENB2 may configure the radio of the second mobile device UE2 in response to a request to intercept the communication data. Additionally or alternatively, the further base station ENB2 may be arranged for autonomously configuring the radio of the second mobile device UE2.

FIG. 1 further shows a plurality of other mobile devices UE3-UE6 which are also involved in D2D communication. As a result, a separate D2D communication channel exists between a third mobile device UE3 and a fourth mobile device UE4, and another separate D2D communication channel exists between a fifth mobile device UE5 and a sixth mobile device UE6. To avoid or make it more difficult that the subject detects that he/she is a subject of lawful interception by measuring differences between the radio signals RS of, on the one hand, the first mobile device UE1, and on the other hand, radio signals of one of the other mobile devices UE3-UE6, the base station ENB1 may be arranged for, when configuring the radio RD1 of the mobile device UE1 to increase the transmission range, also configuring the radios of other mobile devices UE3-UE6 involved in D2D communication to increase their transmission range. In the example of FIG. 1, this may comprise configuring the radios of substantially all mobile devices involved in D2D communication, e.g., the third mobile device UE3, the fourth mobile device UE4, the fifth mobile device UE5, and the sixth mobile device UE6. Moreover, the radio of the second mobile device UE2 may also be configured accordingly if this has not been done so by, e.g., the base station ENB1.

Additionally or alternatively, the base station ENB1 may be arranged for selecting the other mobile devices of which the radios are configured based on an estimate of a geographical distance to the first mobile device UE1 and/or the second mobile device UE2 of the D2D communication channel. Consequently, only those mobile devices which are in relative close proximity to the first mobile device UE1 and/or the second mobile device UE2 may be configured accordingly. In the example of FIG. 1, this may result in the third mobile device UE3 and the fourth mobile device UE4 being configured accordingly, whilst the fifth mobile device UE5 and the sixth mobile device UE6 may not be configured specifically to increase said transmission range. It is noted that various ways are known in the field of telecommunications which allow the mobile network MN to estimate the geographical distance between two mobile devices connected to the mobile network MN. For example, such an estimate may be based on measurement reports which are periodically sent by mobile devices to base stations to enable determining whether a handover to another base station has to take place. Alternatively or additionally, the estimate may be based on trilateration or triangulation by different base stations, GPS-based location information, etc.

It is noted that the radios of the other mobile devices may be configured for increasing the transmission range of the radio signals during a certain period of time, e.g., while the subject of the lawful intercept is involved in D2D communication.

FIGS. 4-7 relate to embodiments of the present invention within the context of LTE. It is noted that the context of LTE is not a limitation. In particular, references to the mobile network MN, the controller 010, the base station ENB1 and/or the further base station ENB2 being arranged for a particular function or purpose are to be understood as being also applicable in general, i.e., outside the context of LTE.

The following refers to concepts and terms relating to lawful interception as defined by the ETSI Technical Committee on Lawful Interception, in particular to:

Law Enforcement Agency (LEA): an organization authorized by a lawful authorization based on a national law to request interception measures and to receive the results of telecommunications interceptions;

Law Enforcement Monitoring Facility (LEMF): a facility designated as the transmission destination for the results of interception;

Mediation Function (MF): a mechanism which passes information between i) a network operator, an access provider or service provider and ii) a Handover Interface (HI), and/or which passes information between the Internal Network Interface and the Handover Interface;

Intercept Related Information (IRI): a collection of information or data associated with telecommunication services involving the subject of interception, specifically communication associated information or data (including unsuccessful communication attempts), service associated information or data (e.g. service profile management by subscriber) and location information;

Content of Communication (CC): information exchanged between two or more users of a telecommunication service, excluding Intercept Related Information Subject of Interception: the subscriber for which the MNO has received a warrant to intercept only IRI, or the combination of IRI and CC.

It is noted that the subscriber indicated by the interception request corresponds to the abovementioned subject of interception, and that the communication data exchanged via the D2D communication channel corresponds to said content of communication.

Figure 4:
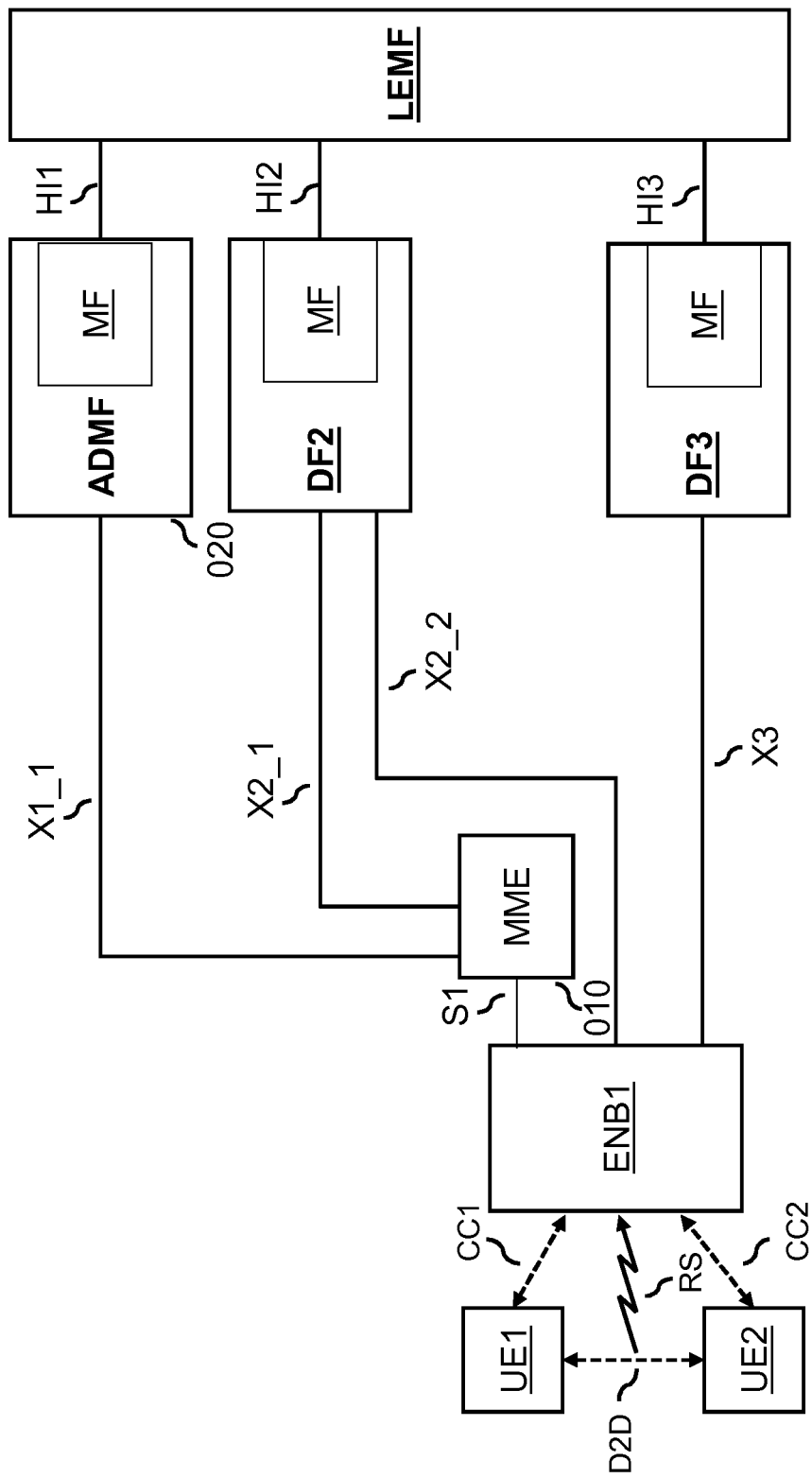
FIG. 4 shows an embodiment within the context of LTE.

FIG. 4 shows a first embodiment of the present invention within the context of LTE. Here, the base station ENB1 is shown in the form of an eNodeB. Moreover, the mobile device UE1 and the second mobile device UE2 are shown being connected to the eNodeB ENB1 via a control channel CC1, CC2. Moreover, the LEMF is shown. It is noted that the LEMF may be considered as not being part of the mobile network MN but rather an external facility. FIG. 4 further shows a plurality of handover interfaces HI1-HI3 for enabling communication between the mobile network MN and the LEMF, and in particular, for enabling delivery of intercepted communication data to the LEMF. A first handover interface HI1 is a so-termed administrative interface and is used to transport various kinds of administrative information between the LEA and the mobile network MN via the LEMF. A second handover interface HI2 is used for transporting IRI from the mobile network MN to the LEMF. A third handover interface HI3 is used for transporting CC to the LEMF. FIG. 4 further shows a plurality of functions, in particular an administration function (ADMF), a delivery function DF2 and a further delivery function DF3. It is noted that these functions constitute functional entities within the mobile network MN, which may be implemented on various equipment of the mobile network MN, e.g., different servers, on a same server, etc.

The administration function ADMF constitute a possible embodiment of the lawful intercept controller 020. The ADMF may manage the execution of the LI. For example, the ADMF may instruct other entities in the mobile network MN to intercept the communication data of a particular subscriber. In particular, the ADMF may issue the interception request to the controller 010 via an internal network interface X1. In this respect, it is noted that in the 3GPP specification TS 33.107, the internal network interfaces for LI are labeled with an X and a number that corresponds to the handover interface. Consequently, the internal network interface for the ADMF is labeled and referred to as X1. Moreover, a first X1 internal network interface is referred to as X1_1, a second as X1_2, etc.

The intercepted communication data may be delivered to a delivery function. The delivery function may be responsible for delivery of intercepted communication to the LEMF. FIG. 4 shows the delivery function DF2 for the second handover interface HI2 and the further delivery function DF3 for the third handover interface HI3. FIG. 4 further shows a mediation function MF being part of the delivery functions DF2, DF3 and the ADMF. The mediation function MF is defined by the 3GPP specification TS 33.107 and transfers IRI and CC to the LEMF according to national requirements and protocol.

FIG. 4 shows the controller 010 being implemented in the form of a mobility management entity (MME). However, this is not a limitation, as the controller 010 may equally be constituted by another entity within the mobile network MN. The MME receives requests for establishing LTE D2D communication between mobile devices. Based on whether the subscribers are authorized, the MME controls the establishment of the LTE D2D communication between the corresponding mobile devices. The MME may also control the activation and deactivation of LI of the LTE D2D communication.

Figure 5:
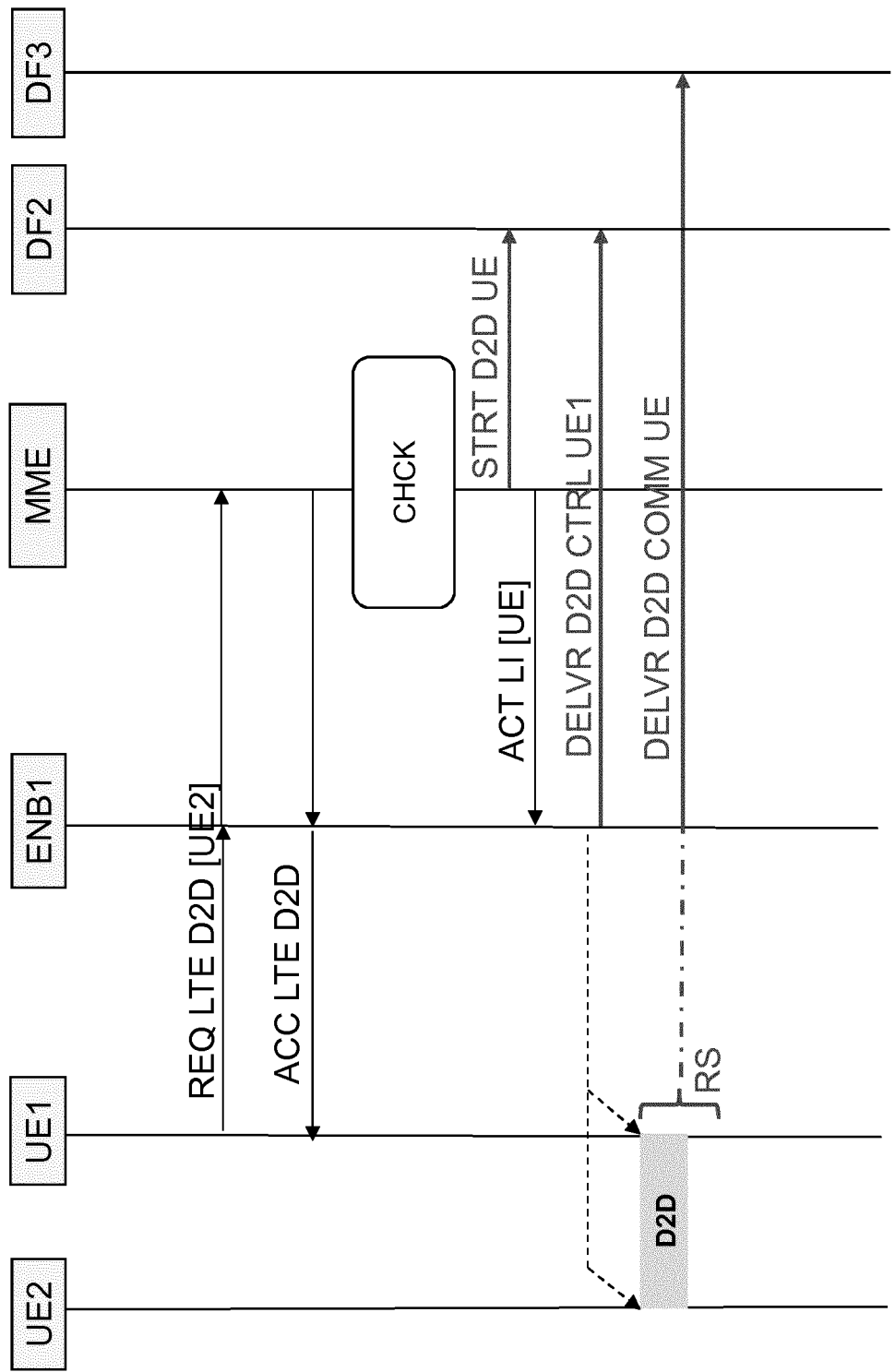
FIG. 5 shows a message exchange representing an establishing of the D2D communication channel and an interception of the communication data.

FIG. 5 exemplifies a message exchange within the mobile network MN of FIG. 4 for providing LI. Here, the ADMF requests the MME to intercept the communication data of a particular subscriber. Accordingly, when the MME receives a request "REQ LTE D2D [U2E]" from the first mobile device UE1 to establish LTE D2D communication with the second mobile device UE2, the MME provides an acknowledge of the request "ACC LTE D2D" and, in a step titled "CHCK", checks whether the initiator of the request, i.e., the first mobile device UE1, and/or the recipient, i.e., the second mobile device UE2, are subjects of interception. If so, the MME signals a start of the D2D communication via the delivery function DF2 with a message "STRT D2D UE". Moreover, the MME requests and thereby activates LI on the eNodeB ENB1 via a message "ACT LI [UE]". In response, the eNodeB ENB1 may configure the radio of the first mobile device UE1 and of the second mobile device UE2 so as to increase the transmission range of the radio signals of the LTE D2D communication channel. Moreover, the eNodeB ENB1 intercepts the control data exchanged over the LTE D2D control channel(s) CC1 with the first mobile device UE1. Based on the control data, the eNodeB ENB1 generates IRI events and information and transfers said data to the delivery function DF2 via a message "DELVR D2D CTRL UE1". Moreover, the eNodeB ENB1 intercepts the communication data exchanged between the first mobile device UE1 and the second mobile device UE2 by intercepting the radio signals RS of the LTE D2D communication channel. The eNodeB ENB1, or another decoding entity, decodes the communication data from the radio signals RS and delivers the communication data as CC to the further delivery function DF3 via a message "DELVR D2D COMM UE".

It is noted that in case the mobile network MN provides confidentiality protection for the LTE D2D communication between the two mobile devices UE1, UE2, the mobile network MN typically provides one or more cryptographic keys to the two mobile devices UE1, UE2. These cryptographic keys may be used to encrypt the communication data exchanged via the LTE D2D communication channel. In order for the mobile network MN to provide LI for such encrypted LTE D2D communication, the mobile network MN may provide access to the cryptographic keys, and/or the mobile network MN may decrypt the encrypted communication data before delivery as CC to the LEMF.

Figure 6:
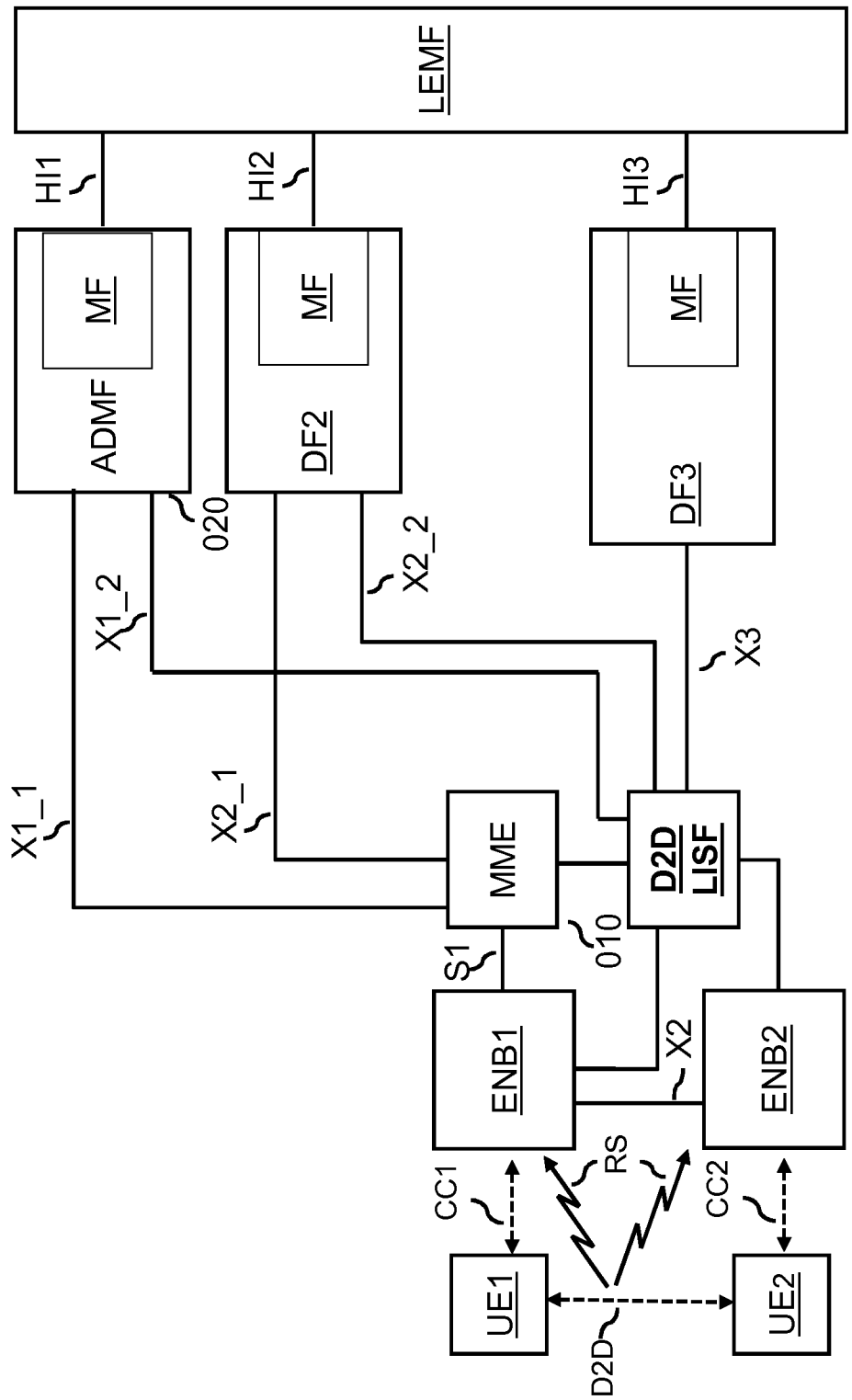
FIG. 6 shows an embodiment involving the use of a further base station.
Figure 7:
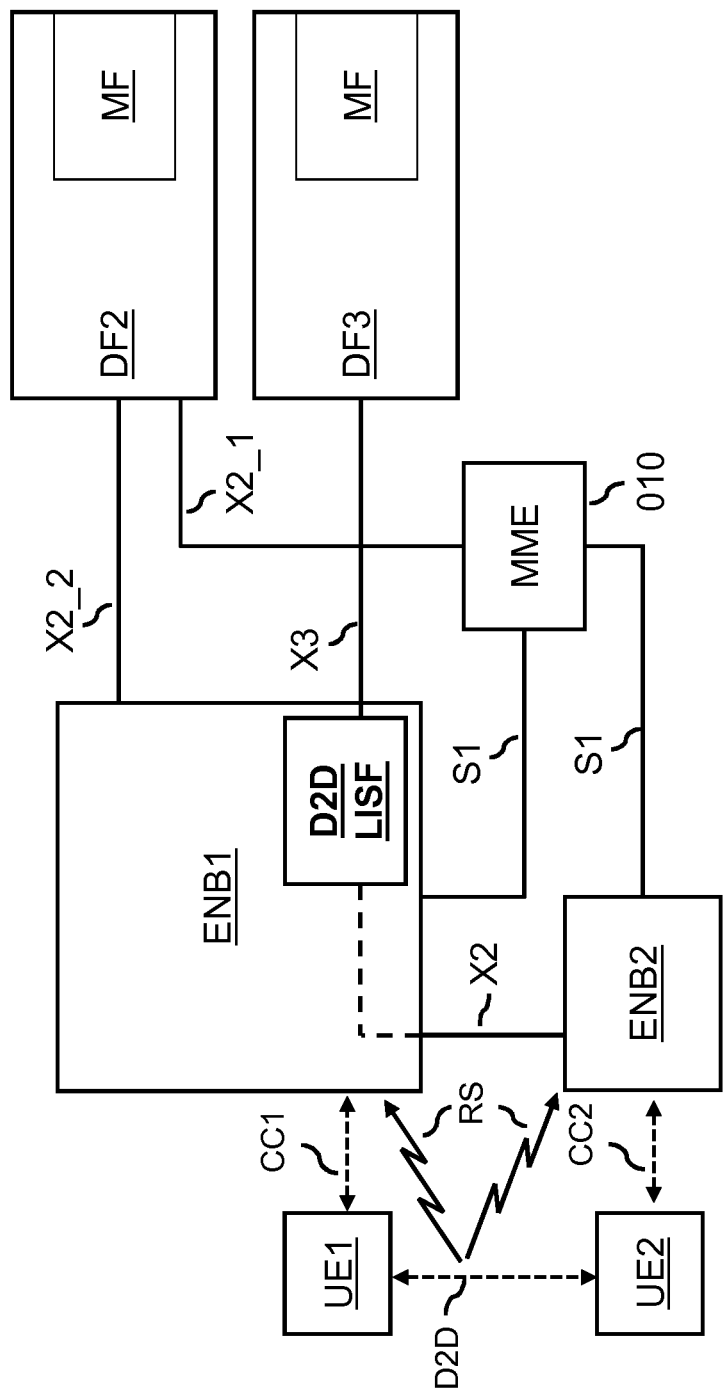
FIG. 7 shows another embodiment involving the use of a further base station.

FIGS. 6 and 7 shows embodiments of the present invention within the context of LTE which address the following: when the LTE D2D communication between the two mobile devices UE1, UE2 takes places at some distance from the eNodeB ENB1 it may be difficult for the eNodeB ENB1 to receive the radio signals RS of the LTE D2D communication channel correctly. A reason for this may be that the signal strength of the radio signals RS of the LTE D2D communication channel may be too low for the eNodeB ENB1 to correctly receive these radio signals. The embodiment of FIGS. 6 and 7 provide multiple, i.e., more than one, eNodeBs which participate in the LI of the radio signals RS. In particular, in addition to the eNodeB ENB1, a further eNodeB ENB2 is provided. FIG. 6 shows the further eNodeB ENB2 having established a control channel CC2 between the second mobile device UE2 and the mobile network MN. However, it will be appreciated this is not needed, i.e., the further eNodeB ENB2 can participate in the LI of the radio signals RS without controlling the second mobile device UE2 via the control channel CC2.

The mobile network MN of FIGS. 6 and 7 further comprise a combiner D2D-LISF for reconstructing the radio signals RS of the LTE D2D communication channel by combining the radio signals RS received by eNodeB ENB1 and the radio signals received by the further eNodeB ENB2. The combiner may be provided by a specific LI function, e.g., a D2D LI support function. The combiner D2D-LISF may deliver the results of the reconstruction to the further delivery function DF3 via an X3 internal network interface. It is noted that the embodiments of FIGS. 6 and 7 differ in that FIG. 6 shows the combiner D2D-LISF being a separate entity within the mobile network MN, while FIG. 7 shows the combiner D2D-LISF being part of, i.e., comprised in, the eNodeB ENB1. It is noted that for clarity reasons, FIG. 7 omits further showing the ADMF and the LEMF.

LI using multiple eNodeBs may be performed as follows. When the eNodeB ENB1 is instructed by the controller 010 to intercept the LTE D2D communication of a particular subject, the eNodeB ENB1 may estimate the location of the first mobile device UE1 and the second mobile device UE2. For that purpose, measurement reports may be used which are periodically sent by mobile devices to eNodeBs. Based on the estimated location of the first mobile device UE1 and the second mobile device UE2, the eNodeB ENB1 may select which further eNodeB(s) may be used to intercept the radio signals RS of the LTE D2D communication channel between the mobile devices UE1, UE2. The eNodeB ENB1 may instruct the further eNodeB(s) over an X2 radio access network signal interface to assist in the LI. It is noted that such an X2 interface differs from the X2 interface to the delivery function DF2 in that the former constitutes a radio access network signal interface between eNodeBs and that the latter constitutes an internal network interface used for delivery of IRI.

The eNodeB ENB1 may provide parameters which identify the particular LTE D2D communication channel, e.g., in the form of D2D control data and/or the interception request. Each of the eNodeBs ENB1, ENB2 may provide the received radio signals to the combiner D2D-LISF which may combine the received radio signals and then demodulate and decode the combined radio signal to obtain the communication data and deliver said data as CC to the further delivery function DF3 via the X3 internal network interface.

It is noted that LI using multiple eNodeBs may advantageously use Coordinated Multipoint (CoMP) reception techniques as known from the field of telecommunications and in particular the field of LTE.

Additionally or alternatively to using multiple eNodeBs simultaneously to perform LI, the task of performing LI may be handed over from the eNodeB ENB1 to a further eNodeB when either or both of the mobile devices UE1, UE2 move from a cell of the eNodeB ENB1, i.e., the originating eNodeB, to a cell of the further eNodeB, i.e., the destination eNodeB. The task of performing LI may be handed over by the controller 010 and/or by the originating eNodeB. In the latter case, the originating eNodeB may transfer, e.g., the interception request, the D2D control data and/or the radio resource parameters to the destination eNodeB. For that purpose, an X2 radio access network signal interface between both eNodeBs may used which is extended with respect to a X2 radio access network signal interface defined by 3GPP to enable the originating eNodeB to hand over the LI task to the destination eNodeB. As such, said X2 interface may be arranged for enabling a base station ENB1 to request a further base station ENB2 to intercept the radio signals RS of the D2D communication channel. Moreover, the originating eNodeB may report the handover of the LI task to the controller 010 or another entity within the mobile network MN.

It will be appreciated that, in general, the further base station ENB2 may be arranged for intercepting the radio signals RS if a reception quality of the radio signals by the base station ENB1 is deemed to be insufficient. The further base station ENB2 may be selected amongst a plurality of base stations based on an estimate of the reception quality of the radio signals RS by the further base station ENB2. The estimate of the reception quality of the radio signals RS by the further base station ENB2 may be based on an estimate of a geographical distance to the mobile device UE1 and/or the further mobile device UE2 of the D2D communication channel. In general, such geographical distance may be established by calculating a difference in location between a mobile device and a base station.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A mobile network for mobile devices, the mobile devices being arranged for exchanging communication data via the mobile network or, by selection, via a Device-To-Device (D2D) communication channel, the mobile network comprising:
   a base station for establishing a control channel between one of the mobile devices and the mobile network; and
   a controller for, via the control channel, i) receiving a request from said one of the mobile devices for establishing the D2D communication channel with a further mobile device, and ii) controlling the establishing of the D2D communication channel by exchanging D2D control data with said one of the mobile devices;
   wherein the controller is arranged for:
   i) receiving an interception request from a lawful intercept controller, the interception request being indicative of a subscriber;
   ii) determining whether a target device associated with the subscriber participates in the D2D communication channel based on the D2D control data;
   iii) if the target device is deemed to participate in the D2D communication channel, requesting the base station to intercept the communication data exchanged via the D2D communication channel;
   and wherein the base station is arranged for, in response to a request from the controller, intercepting radio signals of the D2D communication channel based on the D2D control data.

2. The mobile network according to claim 1, wherein the base station is arranged for configuring a radio of said one of the mobile devices via the control channel for increasing a transmission range of the radio signals of said one of the mobile devices.

3. The mobile network according to claim 2, wherein the base station is arranged for configuring the radio of said one of the mobile devices by providing one or more radio resource parameters to said one of the mobile devices, the one or more radio resource parameters defining one or more of the group of: a signal strength and a frequency.

4. The mobile network according to claim 2, wherein the base station is arranged for, when configuring the radio of said one of the mobile devices for increasing the transmission range, also configuring the radios of other mobile devices involved in D2D communication for said increasing the transmission range.

5. The mobile network (MN) according to claim 4, wherein the base station is arranged for selecting the other mobile devices based on an estimate of a geographical distance to said one of the mobile devices and/or the further mobile device of the D2D communication channel.

6. The mobile network according to claim 2, wherein the base station is arranged for, when configuring the radio of said one of the mobile devices for increasing the transmission range, also configuring the radios of other mobile devices involved in D2D communication which does not involve the target device, for said increasing the transmission range.

7. The mobile network (MN) according to claim 1, further comprising:
   a further base station for intercepting the radio signals of the D2D communication channel based on the D2D control data; and
   a combiner for reconstructing the radio signals of the D2D communication channel by combining the radio signals received by base station and the radio signals received by the further base station.

8. The mobile network according to claim 7, wherein the further base station is arranged for intercepting the radio signals if a reception quality of the radio signals by the base station is deemed to be insufficient.

9. The mobile network according to claim 7, wherein the further base station is selected amongst a plurality of base stations based on an estimate of the reception quality of the radio signals by the further base station.

10. The mobile network according to claim 9, wherein the estimate of the reception quality of the radio signals by the further base station is based on an estimate of a geographical distance to said one of the mobile devices and/or the further mobile device of the D2D communication channel.

11. The mobile network according to claim 7, wherein the base station is arranged for requesting the further base station to intercept the radio signals of the D2D communication channel via the mobile network.

12. The mobile network according to claim 11, further comprising a signal interface provided between the base station and the further base station, wherein the signal interface is arranged for enabling the base station to request the further base station to intercept the radio signals of the D2D communication channel.

13. A base station or controller configured for use in the mobile network according to claim 1.

14. A method for use in a mobile network for mobile devices, the mobile devices being arranged for exchanging communication data via the mobile network or, by selection, via a Device-To-Device (D2D) communication channel, the mobile network comprising:
   a base station for establishing a control channel between one of the mobile devices and the mobile network; and
   a controller for, via the control channel, i) receiving a request from said one of the mobile devices for establishing the D2D communication channel with a further mobile device, and ii) controlling the establishing of the D2D communication channel by exchanging D2D control data with said one of the mobile devices; the method comprising:
   i) receiving an interception request from a lawful intercept controller, the interception request being indicative of a subscriber;
   ii) determining whether a target device associated with the subscriber participates in the D2D communication channel based on the D2D control data; and
   iii) if the target device is deemed to participate in the D2D communication channel, using the base station to intercept the D2D communication channel by intercepting radio signals of the D2D communication channel based on the D2D control data.

15. A controller arranged to execute instructions to control equipment of a mobile network, the mobile network for mobile devices, the mobile devices being arranged for exchanging communication data via the mobile network or, by selection, via a Device-To-Device (D2D) communication channel, the mobile network comprising:
- a base station for establishing a control channel between one of the mobile devices and the mobile network; and
- the controller further arranged for, via the control channel,
  i) receiving a request from said one of the mobile devices for establishing the D2D communication channel with a further mobile device; and ii) controlling the establishing of the D2D communication channel by exchanging D2D control data with the mobile device;
- iii) receiving an interception request from a lawful intercept controller, the interception request being indicative of a subscriber;
- iv) determining whether a target device associated with the subscriber participates in the D2D communication channel based on the D2D control data; and
- v) if the target device is deemed to participate in the D2D communication channel, using the base station to intercept the D2D communication channel by intercepting radio signals of the D2D communication channel based on the D2D control data.

* * * * *